United States Patent [19]
Kouketsu et al.

[11] Patent Number: 6,041,814
[45] Date of Patent: *Mar. 28, 2000

[54] VACUUM PRESSURE CONTROL SYSTEM

[75] Inventors: Masayuki Kouketsu; Masayuki Watanabe; Shinichi Nitta; Hiroshi Takehara, all of Komaki, Japan

[73] Assignee: CKD Corporation, Komaki Aichi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/580,358

[22] Filed: Dec. 28, 1995

[30] Foreign Application Priority Data

Sep. 1, 1995 [JP] Japan .................................... 7-248495

[51] Int. Cl.[7] .................................................. F16K 31/42
[52] U.S. Cl. ........................ 137/488; 137/492.5; 251/121
[58] Field of Search .............................. 137/487.5, 492.5, 137/488, 271; 251/63.5, 26, 121, 62, 63.6, 63

[56] References Cited

U.S. PATENT DOCUMENTS

| | | | |
|---|---|---|---|
| 1,223,326 | 4/1917 | Marsh | 137/271 |
| 3,225,785 | 12/1965 | Goike | 137/487.5 |
| 4,037,619 | 7/1977 | Jeschke | 137/492.5 |
| 4,414,882 | 11/1983 | Frei . | |
| 4,431,159 | 2/1984 | Stubbs | 251/63.6 |
| 4,585,205 | 4/1986 | Coppola | 251/26 |
| 4,613,111 | 9/1986 | Paquet et al. | 251/62 X |
| 4,774,980 | 10/1988 | Etheridge | 137/492.5 |
| 4,778,351 | 10/1988 | Sowards et al. | 251/62 X |
| 5,094,267 | 3/1992 | Ligh | 137/488 |
| 5,158,230 | 10/1992 | Curran | 137/487.5 |
| 5,197,328 | 3/1993 | Fitzgerald | 137/487.5 |
| 5,318,272 | 6/1994 | Smith . | |
| 5,431,182 | 7/1995 | Brown | 137/487.5 |
| 5,460,196 | 10/1995 | Yonnet | 137/487.5 |

FOREIGN PATENT DOCUMENTS

| | | | |
|---|---|---|---|
| 2241550 | 3/1974 | Germany | 251/63.5 |
| 48209 | 9/1982 | Japan | 251/63.5 |

*Primary Examiner*—John Rivell
*Attorney, Agent, or Firm*—Finnegan, Henderson, Farabow, Garrett & Dunner, L.L.P.

[57] ABSTRACT

In a vacuum pressure control system constituted of a vacuum vessel, a vacuum pump sucking gas in the vacuum vessel, a vacuum proportional opening and closing valve disposed on a pipe connecting the vacuum vessel and the vacuum pump, the vacuum proportional opening and closing valve changing its opening to change the vacuum pressure in the vacuum vessel, a pressure sensor to measure the vacuum pressure in the vacuum vessel and a vacuum pressure control device to control the opening of the vacuum proportional opening and closing valve based on the output of the pressure sensor, the vacuum proportional opening and closing valve is provided with a valve seat, a valve member with a tapered surface in its outer periphery and a pilot valve, the valve member being movable along a center line of the valve seat to change a clearance area between the valve seat and the tapered surface, and the vacuum pressure control device controls a servo valve to change the pressure of air to be supplied to the pilot valve based on the output of the pressure sensor.

15 Claims, 14 Drawing Sheets

VACUUM PRESSURE CONTROL SYSTEM

BACKGROUND OF THE INVENTION

1. Field of the Invention

The present invention relates to a vacuum pressure control system capable of controlling vacuum pressure in vacuum vessels at a prescribed value, the vacuum vessels being usually used in semiconductor producing processes.

2. Description of Related Art

In a conventional vacuum pressure control system, which is shown in FIG. 16, usually a vacuum chamber 11 serving as a vacuum vessel is provided with an inlet 13 and an outlet 14, in which wafers 15 to be processed are placed in tires. The inlet 13 is connected with a source of process gas and a source of nitrogen gas which is used for purging the inside 12 of the vacuum chamber 11. The outlet 14 is connected to an inlet port of a pilot type opening and closing valve 20 which consists of a bellows poppet valve. An outlet port of the pilot valve 20 is connected via an opening proportional valve 23 to a vacuum pump 19. The opening proportional valve 23 consists of a butterfly type of opening adjustment valve.

The proportional valve 23 is formed of a circular plate arranged within a pipe extending between the pilot valve 20 and the vacuum pump 19 which has an approximately same diameter as the inner diameter of the pipe and is rotatably about a support shaft provided along the center line of the circular plate. The support shaft is rotated and stopped by a step motor. The opening degree of the proportional valve 23 is dependent on the stop position of the step motor. Usually, measurement of the vacuum pressure inside of the vacuum chamber 11 is made by a pressure sensor 17 and its measured values are fed back to control the stop position of the step motor of the opening proportional valve 23 so as to equalize a vacuum pressure to be measured with a prescribed value of vacuum pressure.

During a producing process, the vacuum chamber 11 is supplied with process gas. In the conventional vacuum pressure control system, the proportional valve 23 is controlled to increase its opening degree when the vacuum pressure value become higher toward the atmospheric pressure than a desired value, thereby allowing the vacuum pump 19 to suck a larger amount of flow of the gas. The proportional valve 23 is, to the contrary, controlled to decrease its opening when the vacuum pressure value become lower toward the absolute value than the desired value, thereby allowing the vacuum pump 19 to suck a lesser amount of flow of the gas.

The butterfly type proportional valve like the aforesaid opening proportional valve 23 can not effect a complete shutoff due to its construction. In trying to completely shut off the pipe with the butterfly type proportional valve, the butterfly valve is usually equipped with an O-ring and the like around the valve to contact with the inner wall of the pipe. In semiconductor producing apparatuses, however, products produced from process gas would be deposited on the surface of the O-ring and make it impossible for the butterfly valve to fully shut off the pipe. It is also impossible to apply a torque load sufficient to the O-ring in order to effect the complete shutoff. The conventional vacuum pressure control system therefore needs an emergent shutoff valve like the pilot type opening and closing valve 20 to be connected to the proportional valve 23 in series.

The shutoff valve needs to have, in addition to the full vacuum shutoff function, an emergency shutoff function to shut off flow of gas as soon as power to the apparatus is cut off. A cylinder type pilot valve is used for the pilot valve 20 accordingly.

In creating a vacuum in the vacuum chamber 11, if the opening of the proportional valve 23 is set larger while a large amount of process gas remains in the vacuum chamber 11, a great volume of the process gas is sucked from the vacuum chamber 11 for a short time, inducing gas current inside thereof and thereby causing a problem of flying up particles which have adhered to the inner wall of the vacuum chamber 11.

Suction of all the particles flied up can not easily be effected. When a large amount of process gas remains in the vacuum chamber 11, usually, control of the suction amount of process gas is effected by increasing little by little at first the opening of the proportional valve 23. To enable this, the proportional valve 23 must be kept stable in a small opening.

However, within a small opening range, the butterfly type proportional valve would largely change its opening by a slight rotation angle due to its construction. It is therefore difficult to set the proportional valve 23 stable with its opening small and slowly outgas from the vacuum chamber 11 by means of the vacuum pump 19.

To solve the problem, in the conventional system, a bypass valve 22 and a shutoff valve 21 are connected in a line. The bypass valve 22 is formed to have a small opening. Closing the pilot valve 20, opening the proportional valve 23 and then opening the shutoff valve 21, the vacuum chamber 11 can be connected to the vacuum pump 19 through a small opening to make it possible to suck slowly the process gas remaining in the vacuum chamber 11.

The control of the suction is effected by a vacuum control device (not illustrated) based on the outputs measured by the pressure sensor 17 to measure the vacuum pressure of the outlet 14. A shutoff valve 16 used for the maintenance of the pressure sensor 17 is further disposed between the outlet port 14 and the pressure sensor 17.

The conventional vacuum pressure control system, however, has the following problems.

(1) A combination of the opening proportional valve 23 consisting of a butterfly type proportional valve and the bypass valve 22 can not effect the precise control of vacuum pressure in a wide range from a low vacuum region including the vacuum pressure near the atmospheric pressure (ex. several Torr), a medium region, to a high region (ex. several mmTorr). In particular, the butterfly valve can not allow a little amount of flow of gas to pass therethrough. The conventional system, even if using the bypass valve, can not cope with the necessity of slight variations in vacuum pressure because the amount of flow of gas is kept constant by the bypass valve.

(2) Besides the proportional valve 23, it needs the pilot valve 20, the bypass valve 22 and the shutoff valve 21, having many joints in a pipe line. This may cause the mixture of particles and others from the joints into the pipe line. The combination of the valves makes the size of a whole apparatus larger and also its using process more complex. This is a problem for the equipment to be used in the semiconductor producing process which requires compactness to each equipment. In addition, there is an issue of cost up in the above equipment.

(3) It is conceivable to utilize a poppet valve for a means of resolving the above problems. This means is that a step motor or a servo motor controls the position of a flat valve to come into contact with and separate from a seat valve. This realizes an integrated component of the proportional valve 23, the bypass valve 22 and the shutoff valve 21. It is however difficult to provide the emergent shutoff function to the poppet valve to be driven by the step motor or the servo motor. Because the step motor or the servo motor stops at the time of interruption of electric service and thus can not close the poppet valve in an emergency. When the valve needs to be closed at a high speed, there is also a problem of it taking about ten seconds for the valve to fully close since the rotation of a step motor can not be speeded up due to the necessity of generating the torque to drive the poppet valve.

SUMMARY OF THE INVENTION

The present invention has been made in view of the above circumstances and has an object to overcome the above problems and to provide a vacuum pressure control system capable of controlling precisely vacuum pressure in a wide range from a low vacuum region to a high, and comprising an emergent shutoff function, with compactness in its construction and low costs.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a vacuum pressure control system of this invention comprising a vacuum vessel, a vacuum pump for sucking gas in the vacuum vessel, a vacuum proportional opening and closing valve disposed on a pipe connecting the vacuum vessel and the vacuum pump, the vacuum proportional opening and closing valve changing its opening to change the vacuum pressure in the vacuum vessel, a pressure sensor to measure the vacuum pressure in the vacuum vessel and a vacuum pressure control device to control the opening of the vacuum proportional opening and closing valve based on output of the pressure sensor, wherein the vacuum proportional opening and closing valve includes a valve seat, a valve member having a tapered surface in its outer periphery and a pilot valve, the valve member being movable along a center line of the valve seat to change a clearance area between the valve seat and the tapered surface; and the vacuum pressure control device controls a servo valve to change pressure of air to be supplied to the pilot valve based on the output of the pressure sensor.

The vacuum pressure control system according to the present invention has the function as will be described below.

The vacuum pump sucks gas from the vacuum vessel to create a vacuum therein. While the vacuum pump goes on sucking a constant volume of gas, the vacuum proportional opening and closing valve is changed its opening to control an amount of gas to be sucked from the vacuum vessel by the vacuum pump to change the vacuum pressure in the vacuum vessel. The pressure sensor makes measurement of the vacuum pressure in the vacuum vessel.

The vacuum pressure control device receives a signal representative of a prescribed pressure value from the central control and then controls the opening of the vacuum proportional opening and closing valve so as to equalize the output of the pressure sensor to the prescribed value.

The opening of the vacuum proportional opening and closing valve which includes a valve member whose periphery is tapered and a valve seat is adjusted by moving the valve member along the center line of the valve seat by means of the pilot valve, to change the area of a clearance between the valve seat and the tapered surface of the valve member.

Control of the air pressure to be supplied to the pilot valve for moving the valve member is effected via the servo valve by the vacuum pressure control device based on the output of the pressure sensor.

For instance, the air supply solenoid valve consisting the servo valve, on receiving pulse signals from the vacuum pressure control device, takes the time on-off action in response to the pulse signals to supply working air to the pilot valve. The air exhaust solenoid valve consisting a solenoid valve, on receiving pulse signals from the vacuum pressure control device, exhausts the air to be supplied to the pilot valve into an exhaust pipe to control the pressure of working air to be supplied to the pilot valve.

The pilot valve comprises a bellofram separating both sides o the piston, so that the piston in moving has only a remarkably slight sliding resistance and its stop positions can fine be adjusted.

The pilot valve including a normally closed type cylinder will fully be closed rapidly and urgently when any trouble such as service interruption occurs.

The pilot valve including a normally opened type cylinder will fully be opened rapidly and urgently when any trouble like service interruption occurs.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Detailed descriptions of preferred embodiments of a vacuum pressure control system, embodying the present invention will now be given referring to the accompanying drawings.

Figure 15:
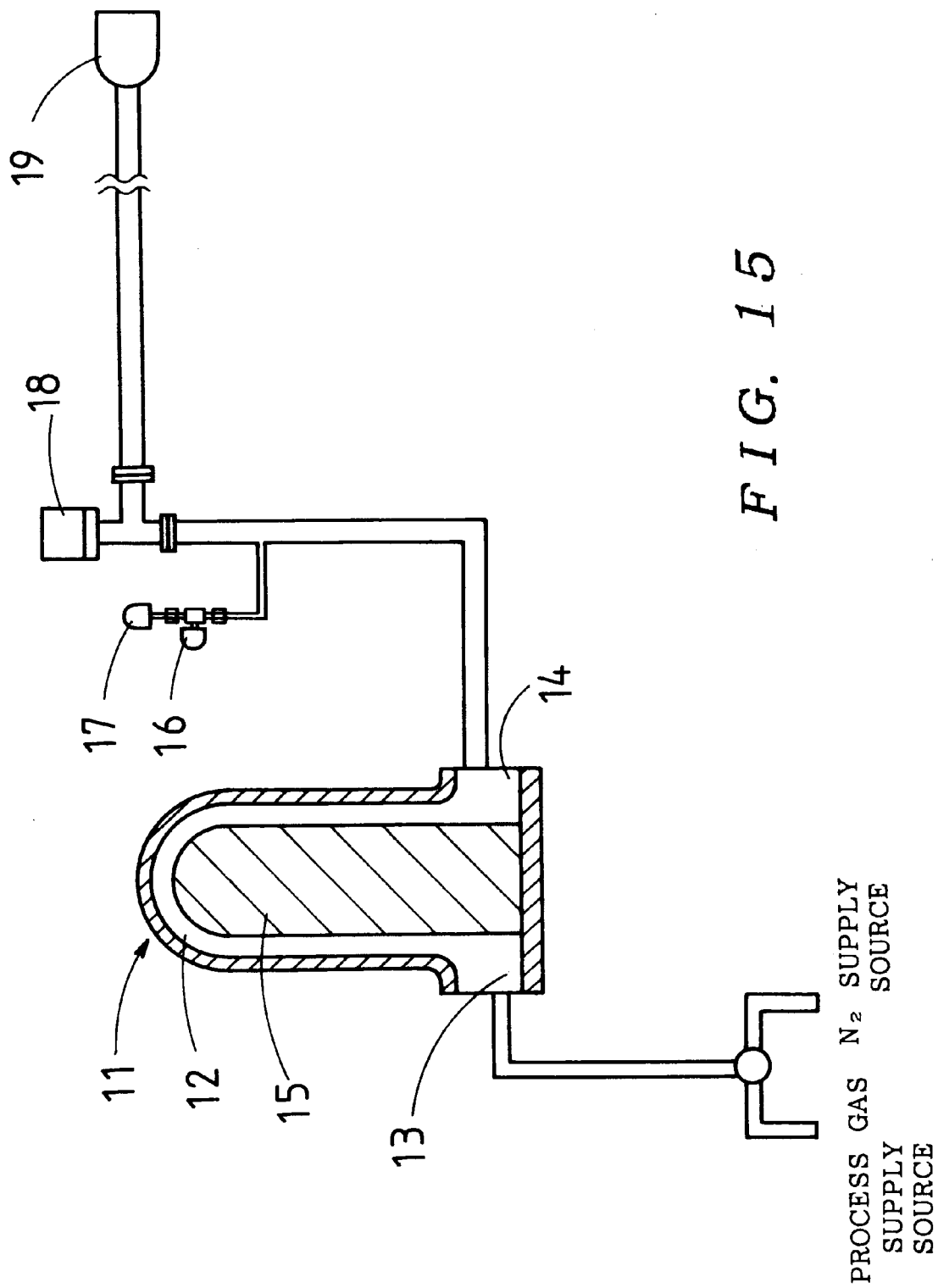
FIG. 15 is a schematic diagram of the construction of the vacuum pressure control system according to the present invention.
Figure 16:
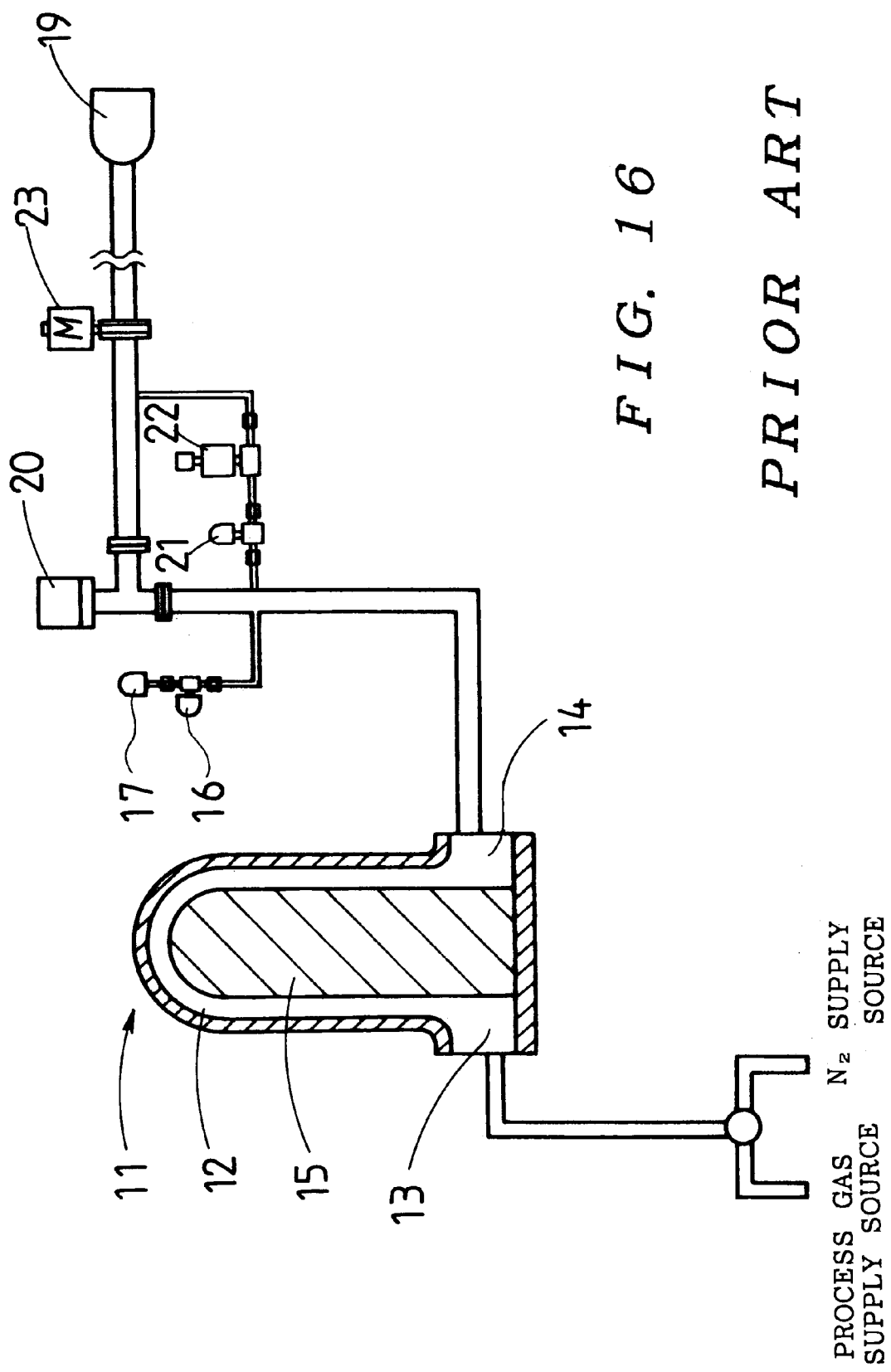
FIG. 16 is a schematic diagram of the construction of the conventional vacuum pressure control system.

FIG. 15 shows a whole construction of the vacuum pressure control system in the first embodiment. Vacuum chamber 11 consisting a vacuum vessel is provided with an inlet 13 and an outlet 14, wherein wafers 15 to be processed are now put in tires. The inlet 13 is connected to a source of process gas and another source of nitrogen gas to purge the inside 12 of the vacuum chamber 11. The outlet 14 is connected to an inlet port of a vacuum proportional opening and closing valve 18 consisting an opening proportional valve. An outlet port of the opening and closing valve 18 is connected to a vacuum pump 19. The outlet 14 is also connected to a pressure sensor 17 via a shutoff valve 16. The present embodiment uses a capacitance manometer for the pressure sensor 17.

Next, the construction of the vacuum proportional opening and closing valve 18 will be described in detail referring to FIGS. 1 and 2.

Figure 1:
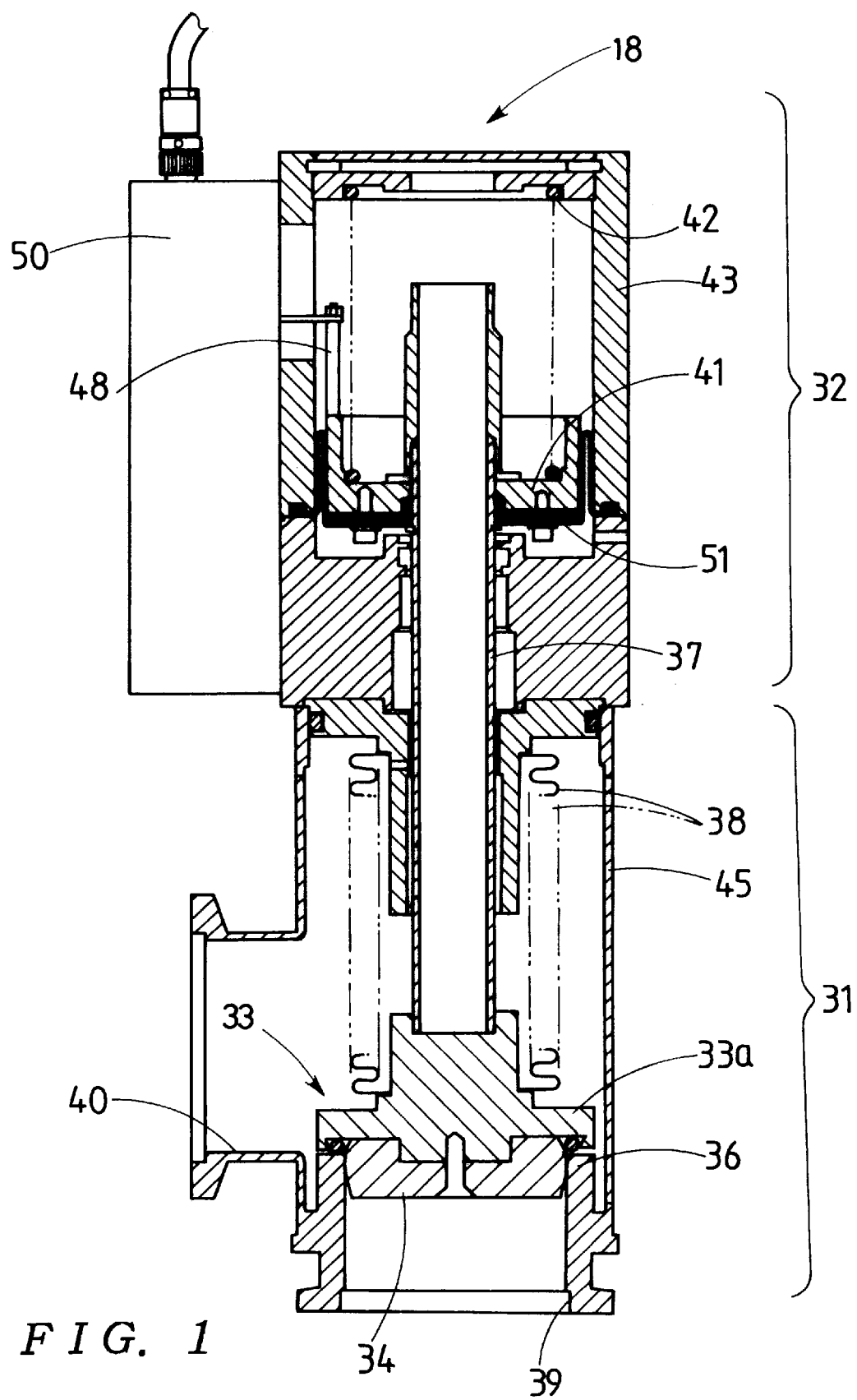
FIG. 1 is a sectional view of a vacuum proportional opening and closing valve 18 to be used in a vacuum pressure control system in a first embodiment according to the present invention.
Figure 2:
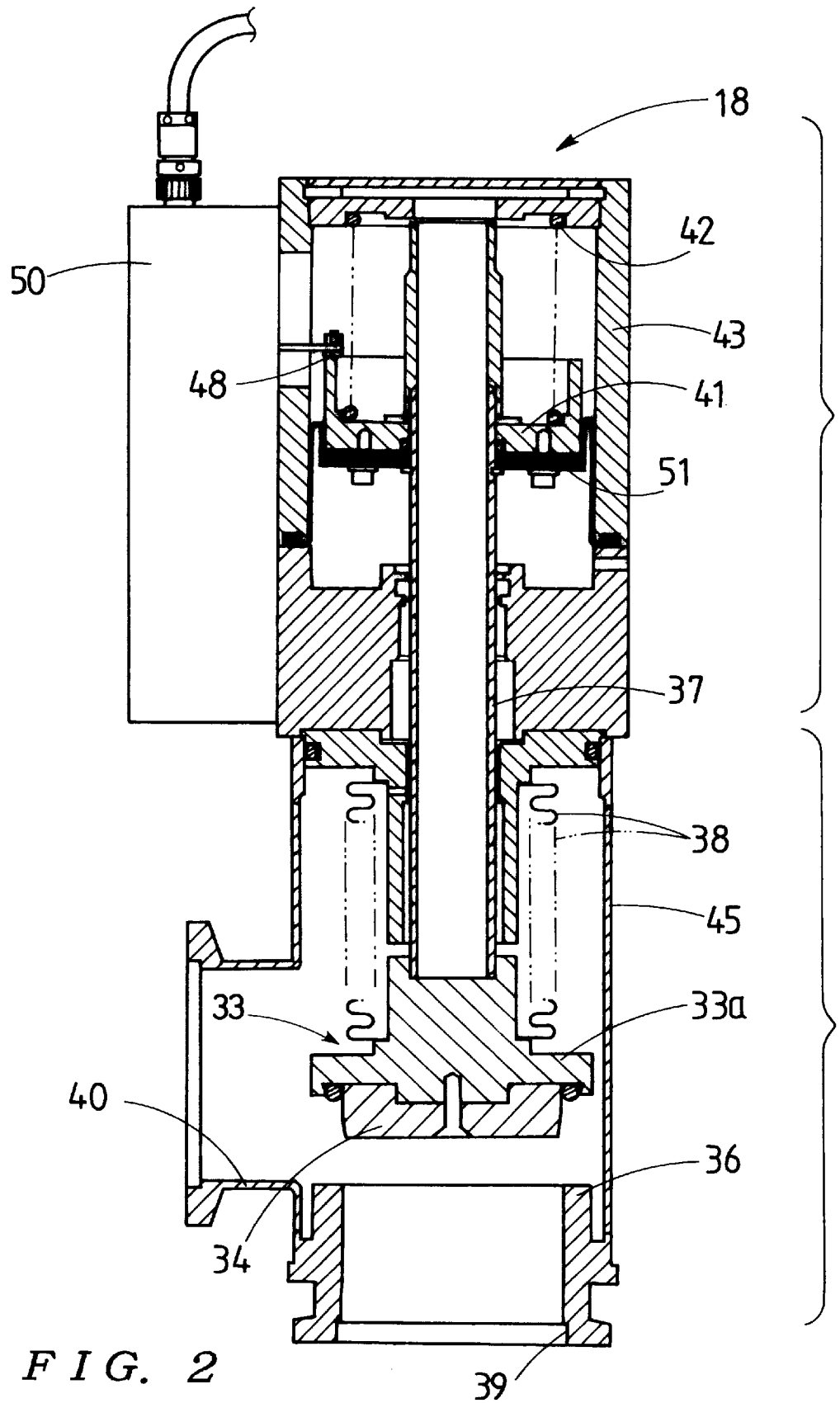
FIG. 2 is a sectional view of the vacuum proportional opening and closing valve 18 of FIG. 1, showing its fully opened state.

FIG. 1 shows a closed state of the vacuum proportional opening and closing valve 18 and FIG. 2 shows a full-opened state thereof.

The vacuum proportional opening and closing valve 18 is formed mainly of upper and lower members, namely, pilot cylinder 32 consisting pilot valve and bellows poppet valve 31. The pilot cylinder 32 is constructed of a single acting pneumatic cylinder 43 and usually a piston 41 provided slidably within the cylinder 43 and biased downward by the force of a return spring 42.

The piston 41 is connected at its upper end with a slide lever 48 which extends outside the single acting pneumatic cylinder 43 and is coupled to a rod (not shown) of a potentiometer 50. This rod is connected to a variable resistance of the potentiometer 50. This potentiometer 50 makes accurate detection of positions of the piston 41.

The piston 41 is connected at its lower end with the inner peripheral end of a bellofram 51. The outer peripheral end of the bellofram 51 is fixed in the chamber wall of the the cylinder 43. The bellofram 51 is designed to be extremely thin and formed of strong clothes made from polyester, tetron (polyethylene glycol telephthalate) and the like which are covered over with rubber. The bellofram 51 is a cylindrical diaphragm having a long stroke and a deep folding part, whose effective pressure area in operating is kept constant and unchanged In the present embodiment the bellofram 51 is used to separate both sides of the piston 41 in the pilot cylinder 32, it causing no generation of stick slip of the piston 41. Accordingly, the piston 41 can be moved with high responsibility and positional precision.

A piston rod 37 is secured in the center of the piston 41 and is slidable vertically in accordance with the movement of the piston 41. The piston rod 37 extending into the bellows poppet valve 31 and its lower end is fixedly connected with the poppet valve 33 set inside of a valve member 45 of the valve 31. The upper surface of the poppet valve 33 is connected with an end of a bellows 38 surrounding it.

Figure 3:
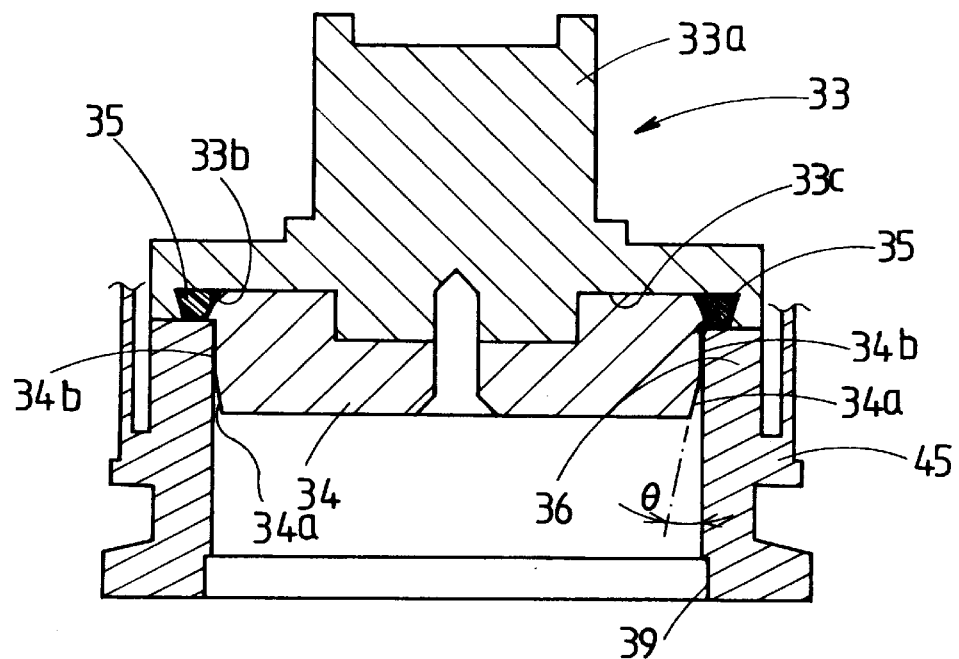
FIG. 3 is a sectional view of the valve seat 36 and the poppet valve 33, showing its fully closed state.
Figure 4:
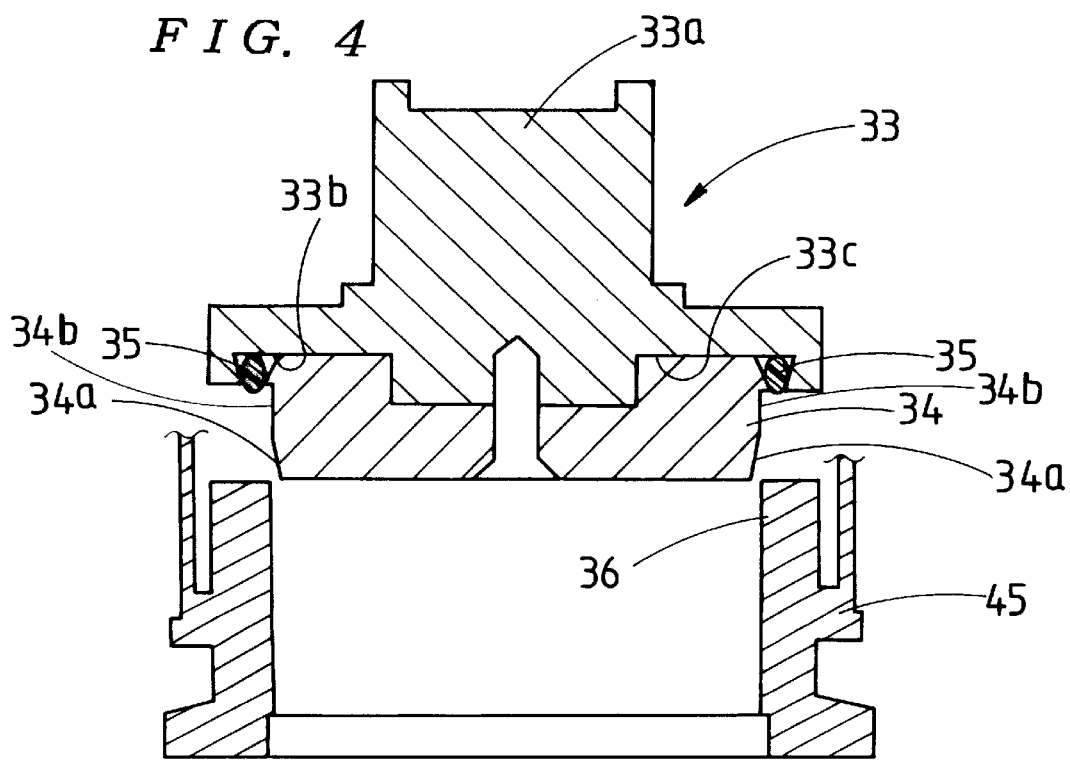
FIG. 4 is a sectional view of the valve seat 36 and the poppet valve 33 in regulating the amount of flow of gas.

A more detail construction of the poppet valve 33 can be seen in FIGS. 3 and 4. FIG. 3 is a closed state of the vacuum proportional opening and closing valve 18 and FIG. 4 is another state of the same in use in a medium vacuum region.

The poppet valve 33 is constituted of a valve member 33a connected with the piston rod 37, a holding part 33b to hold the O-ring 35 and a groove 33c to which a stainless valve member 34 is fitted. The stainless valve member 34 in the present embodiment is formed of SUS316L which is a stainless material prescribed in Japanese Industrial Standard. The O-ring 35 serves to prevent the leakage of flow of gas by being compressed between the poppet valve 33 and a valve seat 36 of the valve member 45. The tapered surface 34a in the present embodiment is designed to have the angle $\theta=3°$. The stainless valve member 34 is provided with a straight portion 34b above the tapered surface 34a.

The valve seat 36 is a hollow cylindrical portion concentrically formed at the inner surface of a lower part of the valve member 45.

As the tapered surface 34a of the stainless valve member 34 moves along the center line of the valve seat 36 the clearance between the tapered surface 34a and the valve seat 36 will be changed in area, as shown in FIG. 4, thus changing the opening degree of the vacuum proportional opening and closing valve 18. As seen again in FIG. 3, when the poppet valve 33 comes into contact with the valve seat 36, the O-ring 35 is pressed onto the upper surface of the valve seat 36. This prevents completely flow of gas from leaking.

Figure 5:
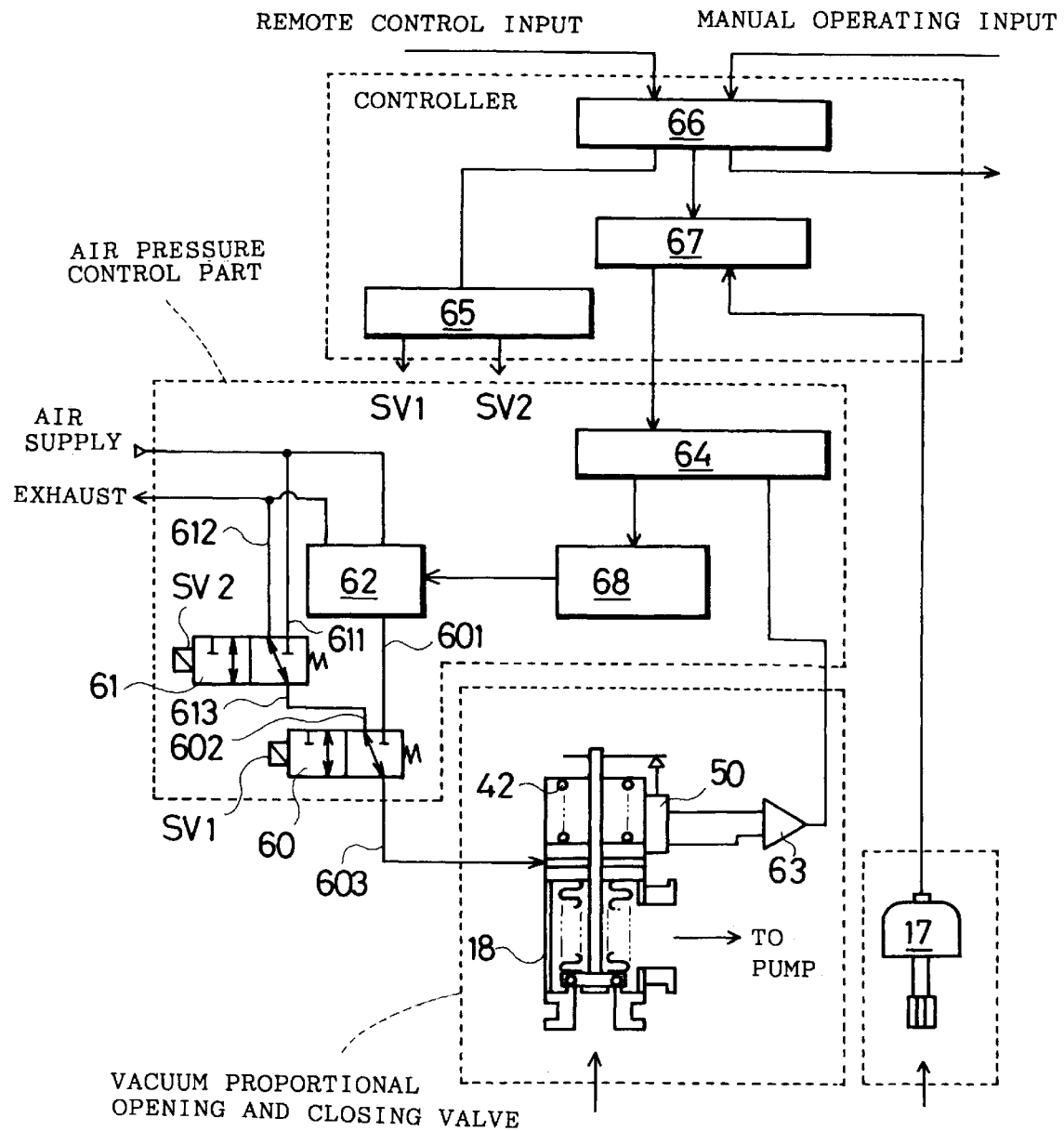
FIG. 5 is a block diagram showing a whole construction of the control device in the vacuum pressure control system in the first embodiment.
Figure 6:
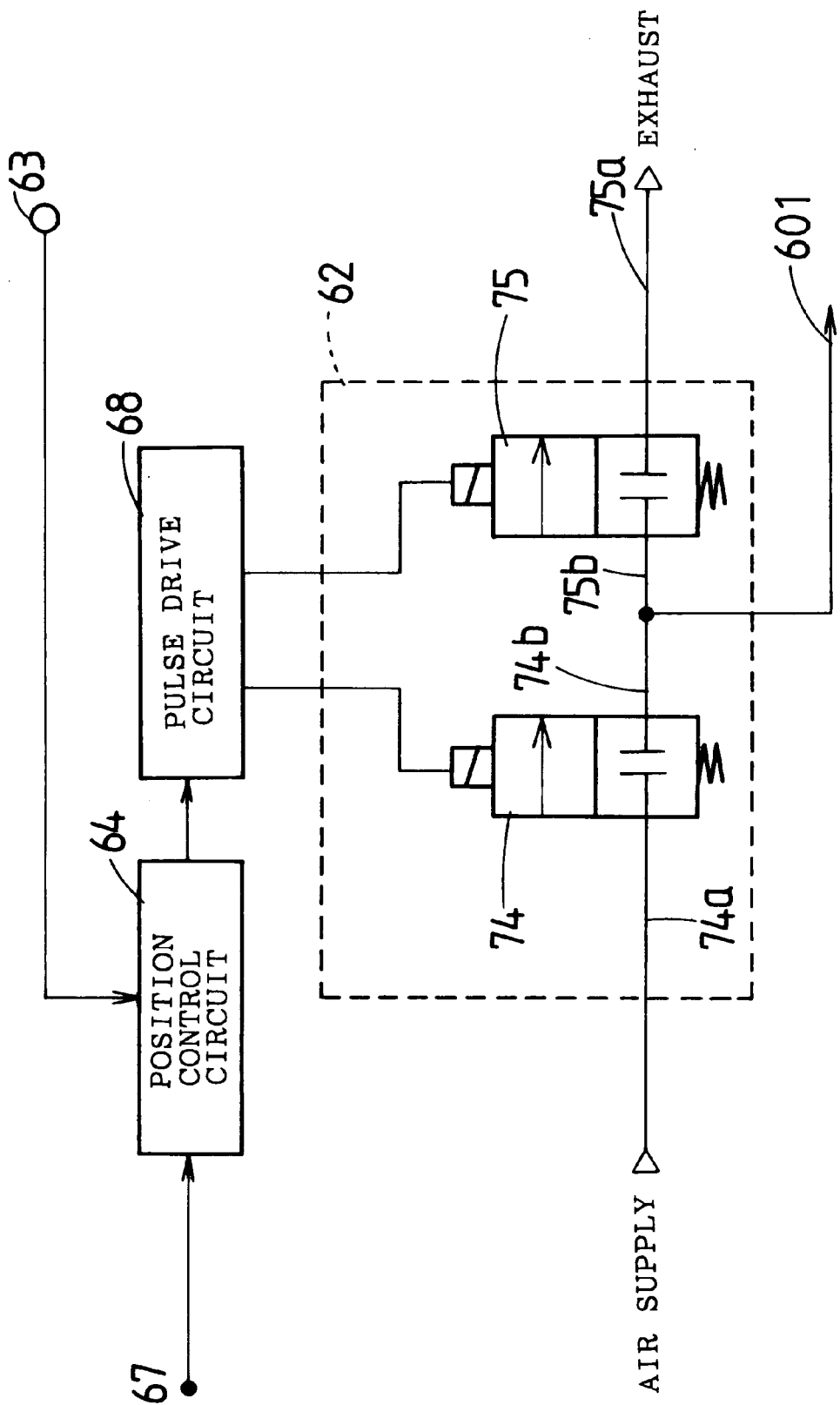
FIG. 6 is a block diagram showing the detail construction of the time on-off acting valve 62.

Next, a control device of the vacuum pressure control system in the present embodiment will be explained. FIG. 5 is the construction of a whole system of the control device. FIG. 6 is the detail construction of a time on-off acting valve 62.

Construction of the air system therein is first described below. The vacuum proportional opening and closing valve 18 is connected to an outlet port 603 of a first solenoid valve 60. The first solenoid valve 60 is connected via a first inlet port 601 to a time on-off acting valve 62 and via a second inlet port 602 to a second solenoid valve 61.

The time on-off acting valve 62 is, as shown in FIG. 6, constituted of a proportional valve for air supply 74 and a proportional valve for exhaust 75. An inlet port 74a of the air supply proportional valve 74 is connected with a source of air to be supplied. An outlet port 75a of the exhaust proportional valve 75 is connected with an air exhaust pipe. An outlet port 74b of the proportional valve 74 and an inlet port 75b of the proportional valve 75 are jointed together with the first inlet port 601 of the first solenoid valve 60.

Construction of the electric system is next explained. The time on-off acting valve 62 is connected with a pulse drive circuit 68. This pulse drive circuit 68 is connected with a position control circuit 64. The position control circuit 64 is also connected to the potentiometer 50 via an amplifier 63 and will be applied with signals representative of positions of the piston 41 from the potentiometer 50. The position control circuit 64 is further connected with a vacuum pressure control circuit 67.

The vacuum pressure control circuit 67 is also connected with an interface circuit 66 and the pressure sensor 17 respectively.

The interface circuit 66 is connected with a sequence control circuit 65 which is connected to a driving coil SV1 of the first solenoid valve 60 and a driving coil SV2 of the second solenoid valve 61.

Operation of the whole vacuum pressure control system constructed as above will be explained in the following.

Rapid gas supply and exhaust operation is described first.

In fully opening the vacuum proportional opening and closing valve 18, the first solenoid valve 60 is driven to be OFF and the second solenoid valve 61 to be ON. Then, the first inlet port 611 of the second solenoid valve 61 is connected to the outlet port 613 to supply air to the vacuum proportional opening and closing valve 18. As shown in FIG. 2, the stainless valve member 34 of the poppet valve 33 is separated from the valve seat 36, so that the vacuum pump 19 sucks a large amount of gas from the vacuum chamber 11 to rapidly exhaust the gas.

In completely closing the vacuum proportional opening and closing valve 18, the first solenoid valve 60 is driven to be OFF and the second solenoid valve 61 to be OFF respectively. Therefore the second inlet port 612 of the second solenoid valve 61 is connected with the outlet port 613, and the second inlet port 602 of the first solenoid valve 60 is connected with the outlet port 603, which connects the vacuum proportional opening and closing valve 18 to the exhaust pipe line.

Then no working air is supplied to the pilot cylinder 32 and the air remaining therein is kept exhausting. This causes the piston 41 to be biased downward by the return spring 42 as shown in FIG. 1 and, finally, the poppet valve 33 comes into contact with the surface of the valve seat 36. At this time, since the O-ring 35 is pressed and deformed by the poppet valve 33 and the valve seat 36, the vacuum proportional valve 18 is tightly closed and no gas leakage occurs.

When an interruption of electric service occurs, similarly, the outlet port 603 and the second inlet port 602 of the first solenoid valve 60 are connected and the outlet port 613 and the second inlet port 612 of the second solenoid valve 61 are connected. The vacuum proportional valve 18 is therefore closed by means of the return spring 42. This realizes the rapid shutoff function in an emergency.

Operation of positional control of the poppet valve 33 in a low, medium and high vacuum regions will now be explained.

As mentioned above, the stainless valve member 34 having the tapered surface 34a, the sectional area of the clearance between the tapered surface 34a and the valve seat 36 will change gradually according to stop positions of the poppet valve 33 as seen in FIG. 4. Control of the stop position of the poppet valve 33 therefore enables changing of a slight amount of the opening of the proportional valve 18. The poppet valve 33 is controlled so that it stops, in the low vacuum region, in a position at which the straight surface 34b substantially comes to contact with the valve seat 36 so as to pass only a leakage flow of gas, in the medium vacuum region, in a position at which the tapered surface 34a faces the valve seat 36 and, in the high vacuum region, in a position at which the tapered surface 34a is apart from the valve seat 36.

A sequence control circuit 65 receives a command signal representative of a desired vacuum pressure value in the vacuum chamber 11 from a central control device via an interface circuit 66, and then drives the driving coil SV1 to open the first solenoid valve 60 and the coil SV2 to close the second solenoid valve 61. Simultaneously the interface circuit 66 provides the command signal representing desired vacuum pressure value to a vacuum pressure control circuit 67.

The vacuum pressure control circuit 67 makes comparison between the desired value of vacuum pressure given by the interface circuit 66 and the actual vacuum pressure value in the vacuum chamber 11 measured by the pressure sensor 17 and controls via a pulse drive circuit 68 the proportional valve for air supply 74 and the proportional valve for exhaustion 75 of the time on-off acting valve 62 in order to control the opening of the vacuum proportional valve 18 so as to equalize the actual vacuum value to the desired value.

In the case that the actual vacuum pressure value in the vacuum chamber 11 is nearer the atmospheric pressure than the desired value provided by the command signal, the piston 41 is moved upward to increase the opening of the vacuum proportional opening and closing valve 18. To the contrary, in the case that the actual vacuum pressure value is nearer the absolute vacuum pressure than the desired, the piston 41 is moved downward to decrease the opening.

The pulse drive circuit 68 is applied with a signal from the vacuum pressure control circuit 67 to convert it into a pulse signal and then provides the pulse signal as an on-off signal to the supply and exhaust proportional valves 74 and 75 respectively, which are on-off operated for a duration according to the pulse signal to make regulation of air pressure to the vacuum proportional valve 18.

Those valves 74 and 75 serve for solenoid valves having the function of separating the aforesaid valve member from the valve seat by a predetermined distance in accordance with pulse input voltages.

The pulse drive circuit 68 drives the air supply proportional valve 74 to supply the working air to the vacuum pressure opening and closing proportional valve 18 and simultaneously drives the exhaust proportional valve 75 to exhaust the working air to be supplied to the valve 18 into the exhaust pipe, so that the supply pressure of working air can finer be regulated.

In this way, both the air supply proportional valve 74 connected with the air supply pipe and the exhaust proportional valve 75 connected with the air exhaust pipe are driven at the same time by pulse voltages provided by the pulse drive circuit 68. This makes it possible to exactly stop the piston 41 at a predetermined position at a high response speed.

The air supply and exhaust proportional valves 74 and 75 are driven in accordance with electric pulse signals having the same constant cycle, and the amount of air to be passed through the valves 74 and 75 respectively are regulated by changing the time ratio of an on-time and off-time between the constant pulses.

Each duty ratio of the air supply proportional valve 74 and the exhaust proportional valve 75 is determined by the position control circuit 64 as will be mentioned below.

To increase the opening of the vacuum proportional valve 18 in a more opening direction than the command value, the duty ratio of the air supply proportional valve 74 is determined to be larger. As a result, the amount of flow of air to be supplied to the vacuum proportional valve 18 increases and the air pressure inside thereof becomes higher accordingly. The valve member is then moved in its more opening direction. This data is fed back via the potentiometer 50 to the position control circuit 64.

The duty ratio of the air supply proportional valve 74 is reduced as the measured value of the potentiometer 50 comes closer to the command value of opening, and then becomes a bias value in exactly equalizing to the command value.

When decreasing the opening degree of the vacuum proportional valve 18 in a more closing direction than the command value, the duty ratio of the air exhaust proportional valve 75 is determined to be larger. As a result, the amount of flow of air to be exhausted from the valve 18 increases and the air pressure inside of the valve is accordingly reduced, causing the valve to move in a more closing direction. This result is fed back via the potentiometer 50 to the position control circuit 64. As the measured value of the potentiometer 50 comes near the opening command value, the duty ratio of the proportional valve 75 is reduced and then, in fully equalizing to the command value, becomes a bias value.

The bias is provided to remove the blind zone of action of the solenoid valve with respect to pulse signals. The blind zone is that caused by the pressure load of air pressure working on the solenoid valve and a return spring disposed in the solenoid valve.

If the vacuum pressure in the vacuum chamber 11 is nearer the atmospheric pressure than the command signal representative of the desired pressure value, for example, the poppet valve 33 is moved slightly upward to increase the valve opening, so that an amount of process gas can be sucked increasingly by the vacuum pump 19. The vacuum pressure value in the vacuum chamber 11 can be therefore equalized to the desired vacuum pressure value provided by the command signal.

Namely, the vacuum pressure control circuit 67 provides pulse voltages via the pulse drive circuit 68 to the proportional valve 74 to separate a valve member from a valve seat of the proportional valve 74, thereby enabling supply of a large amount of working air to the vacuum proportional opening and closing valve 18. This causes the piston 41 and the poppet valve 33 to move upward and the clearance between the tapered surface 34a and the valve seat 36 to increase in sectional area.

It is however difficult to stop the piston 41 exactly at a predetermined position only by driving the proportional valve 74, because the piston 41 may go over. In the vacuum pressure control system of the present embodiment, if the piston 41 is going beyond, it can rapidly and accurately be stopped at a predetermined position since the pressure of the working air to be supplied to the vacuum proportional valve 18 is reduced through the exhaust proportional valve 75.

Further, the vacuum pressure in the vacuum chamber 11 is nearer the absolute vacuum value than the desired, for example, the poppet valve 33 is moved slightly downward to reduce the valve opening, so that a lesser amount of process gas is sucked by the vacuum pump 19. The vacuum pressure value in the vacuum chamber 11 can therefore be equalized to the vacuum pressure value provided by the command signal.

The vacuum pressure control circuit 67 provides pulse voltages via the pulse drive circuit 68 to the proportional valve 75 to separate a valve member from a valve seat of the proportional valve 75, thereby enabling to stop supplying the working air to the vacuum proportional valve 18 and to increase the exhaust amount of the air. This causes the piston 41 and the poppet valve 33 to move downward thereby to decrease the sectional area of the clearance between the tapered surface 34a and the valve seat 36.

It is similarly difficult to stop the piston 41 exactly at a predetermined position only by driving the proportional valve 75 because the piston 41 may go back over. In the vacuum pressure control system of the present embodiment, if the piston 41 is going beyond, it can rapidly and accurately be stopped at a predetermined position since the pressure of the working air to be supplied to the vacuum proportional opening and closing valve 18 is increased through the supply proportional valve 74.

Figure 10:
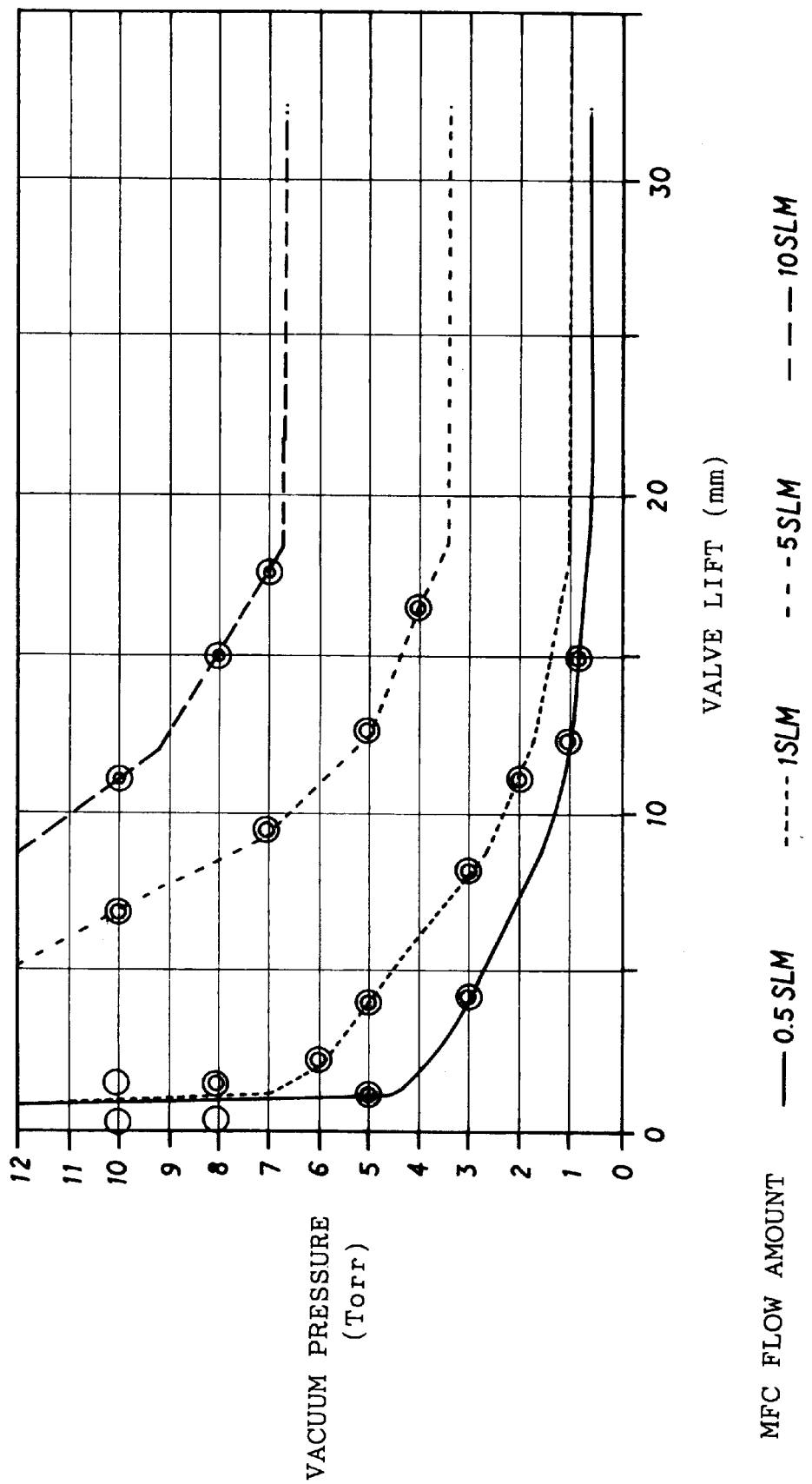
FIG. 10 is a chart of the first data showing the relation between the vacuum pressure and the lift amount of the poppet valve 33.
Figure 11:
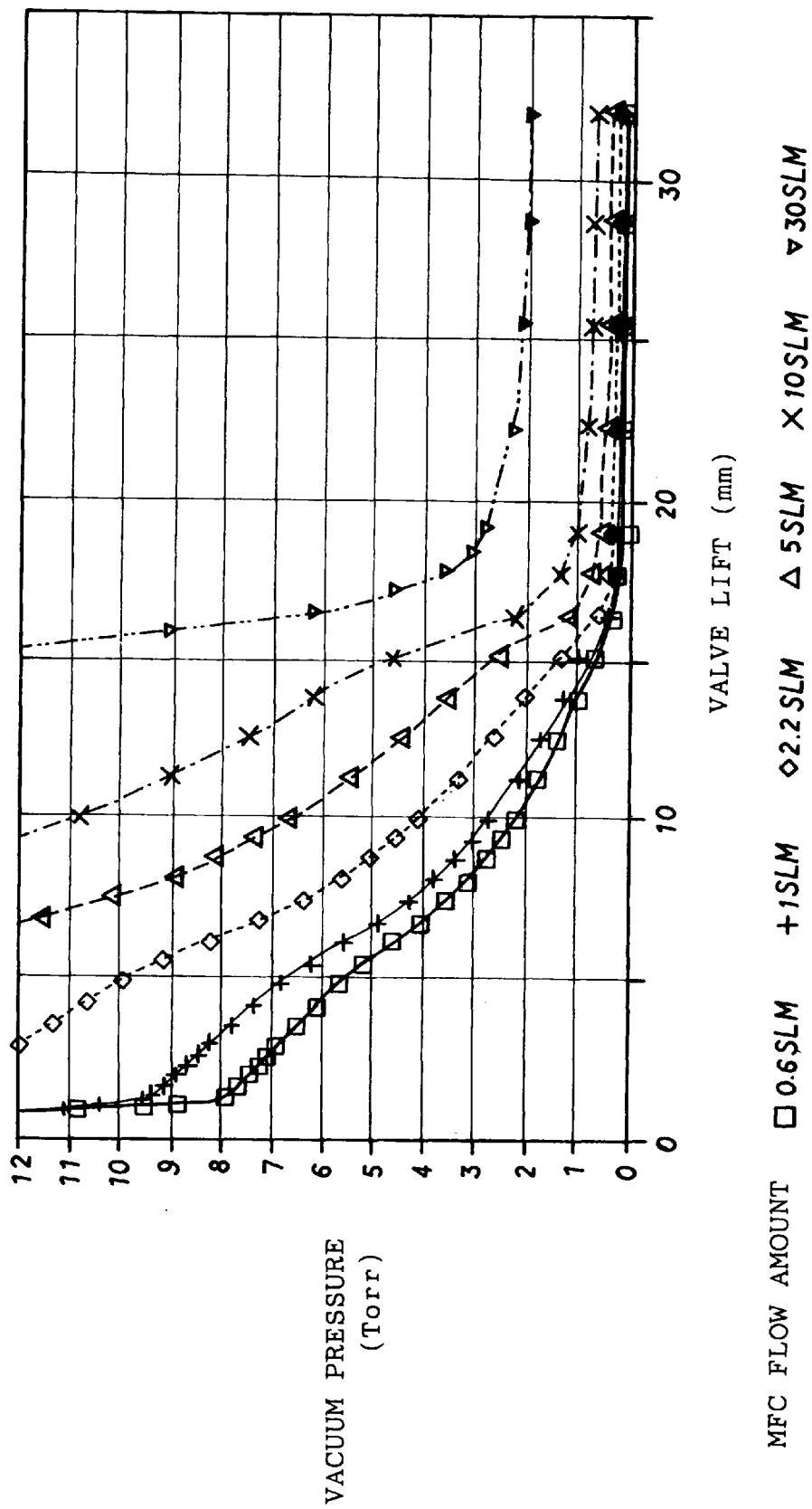
FIG. 11 is a chart of the second data showing the relation between the vacuum pressure and the lift amount of the poppet valve 33.

FIGS. 10 and 11 shows experimental results as to the effect of the vacuum pressure control system in the present embodiment. In both charts, the vertical axis indicates vacuum pressure (Torr) and the lateral axis lift amount (mm) which is a distance between the poppet valve 33 and the valve seat 36. FIG. 10 is a case of a vacuum pump 19 which sucks gas at a rate of 1000 liter per minute and FIG. 11 is at a rate of 15000 liter per minute. An amount of flow of MFC is a measurement value of a mass flow controller to measure the flow of system gas and its is standard liter per minute. The vacuum pressure control system used in semiconductor producing processes mostly needs to keep a predetermined vacuum pressure in a predetermined amount of flow of system gas.

As can be seen from FIGS. 10 and 11, the lift amount of the poppet valve 33 is changed linearly with the vacuum pressure measured since the slanting angle of the tapered surface 34a is designed so as to correspond linearly to the poppet valve 33 and the vacuum pressure.

Figure 12:
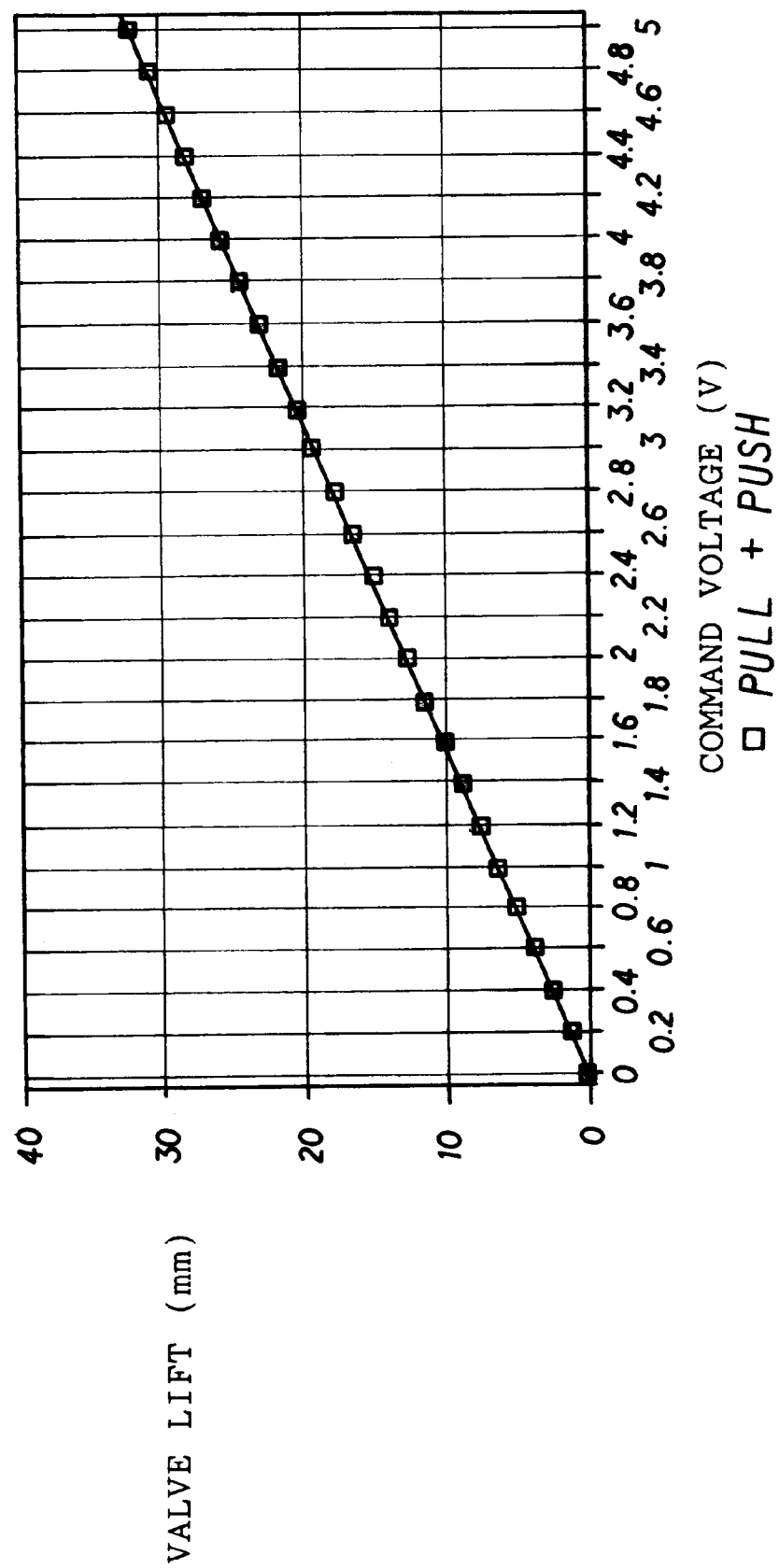
FIG. 12 is a chart of the relation between the lift amount of the poppet valve 33 and the command voltage.

The vacuum pressure quite responds to the accuracy of stop positions of the poppet valve 33. Test results as to the stopping accuracy of the poppet valve 33 are shown in FIG. 12, the vertical axis indicating the lift amount of the poppet valve 33 and the lateral axis indicating a command voltage to be provided as command signal. As can be seen from FIG. 12, the vacuum pressure control system in the present embodiment effects linear and precise control of the command voltage and the lift amount of the poppet valve 33.

The vacuum pressure can be seen to have been corresponded precisely to the command value through the lift amount of the poppet valve 33.

In operating the proportional valve 18 with a small opening degree in a low vacuum region, generally, products of process gas may be deposited on the surfaces of the tapered surface 34a and the valve seat 36 since the clearance therebetween is reduced. The products deposited may cause inclusion of products or change of the sectional area of a flow path of gas. Particles produced by the products may also result in pollution inside of the vacuum chamber. Accordingly, the valve seat 36 and the tapered surface 34a and others are heated to prevent the products produced by process gas from depositing thereon.

In the embodiment, deposition of products of process gas on the stainless valve member 34 is detected based on, in a standard process condition, the output of the potentiometer 50 when the valve is fully closed, namely, variation in the opening degree of the valve.

As described in detail above, the vacuum pressure control system in the embodiment comprises the vacuum proportional valve 18 which includes the valve seat 36 formed inside of an inlet of a cylinder, and the poppet valve 33 provided with the tapered surface 34a in its periphery. The poppet valve 33 enables the change of clearance area between the valve seat 36 and the tapered surface 34a by moving along the center line of the valve seat 36 and the pilot cylinder 32. The positional control circuit 64 effects control of the air supply proportional valve 74 to supply working air to the pilot cylinder 32 in accordance with the output of the pressure sensor 17 and control of the exhaust proportional valve 75 at the same time. The vacuum pressure control system therefore can effect the precise control of the vacuum pressure in the vacuum chamber 11 in a wide region ranging from a low and medium to high vacuum regions, without requiring the use of bypass valve.

Due to no necessity of bypass valve, it is possible to give the whole vacuum pressure control system compactness and keep its entire cost down.

Additionally, the vacuum pressure control system in the present embodiment comprises the solenoid valve to supply working air to the pilot cylinder 32, the solenoid valve including the air supply proportional valve 74 connected between the pilot cylinder 32 and the air supply source and the exhaust proportional valve 75 connected between the pilot cylinder 32 and the exhaust pipe. And the positional control circuit 64 provides pulse voltages to the supply and exhaust proportional valves 74 and 75 to control the opening of the proportional valve 18, so that the vacuum pressure value in the vacuum chamber 11 can be controlled instantaneously and exactly to a predetermined pressure value.

Figure 7:
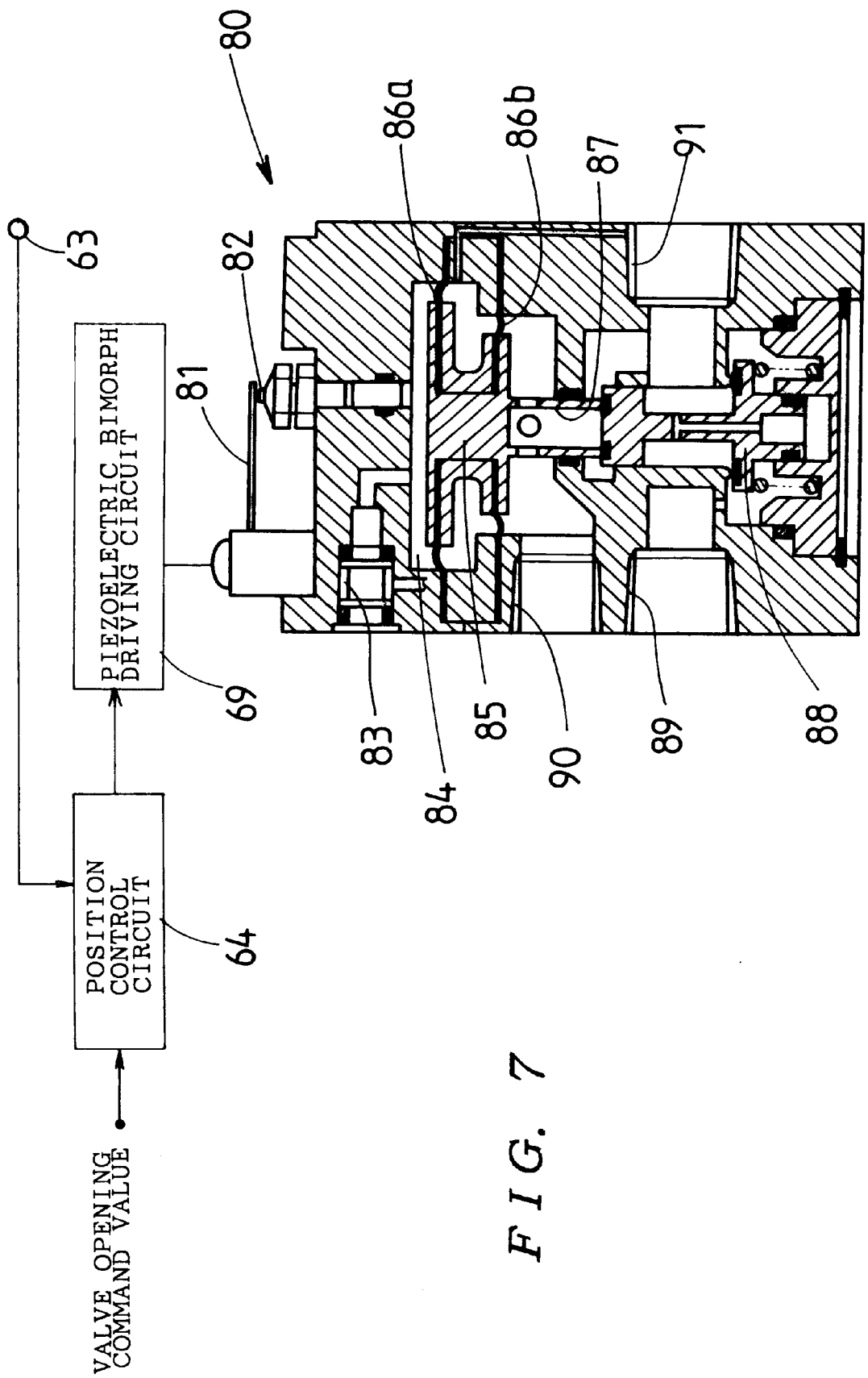
FIG. 7 is a sectional view of a servo valve 80 of nozzle flapper type.
Figure 8:
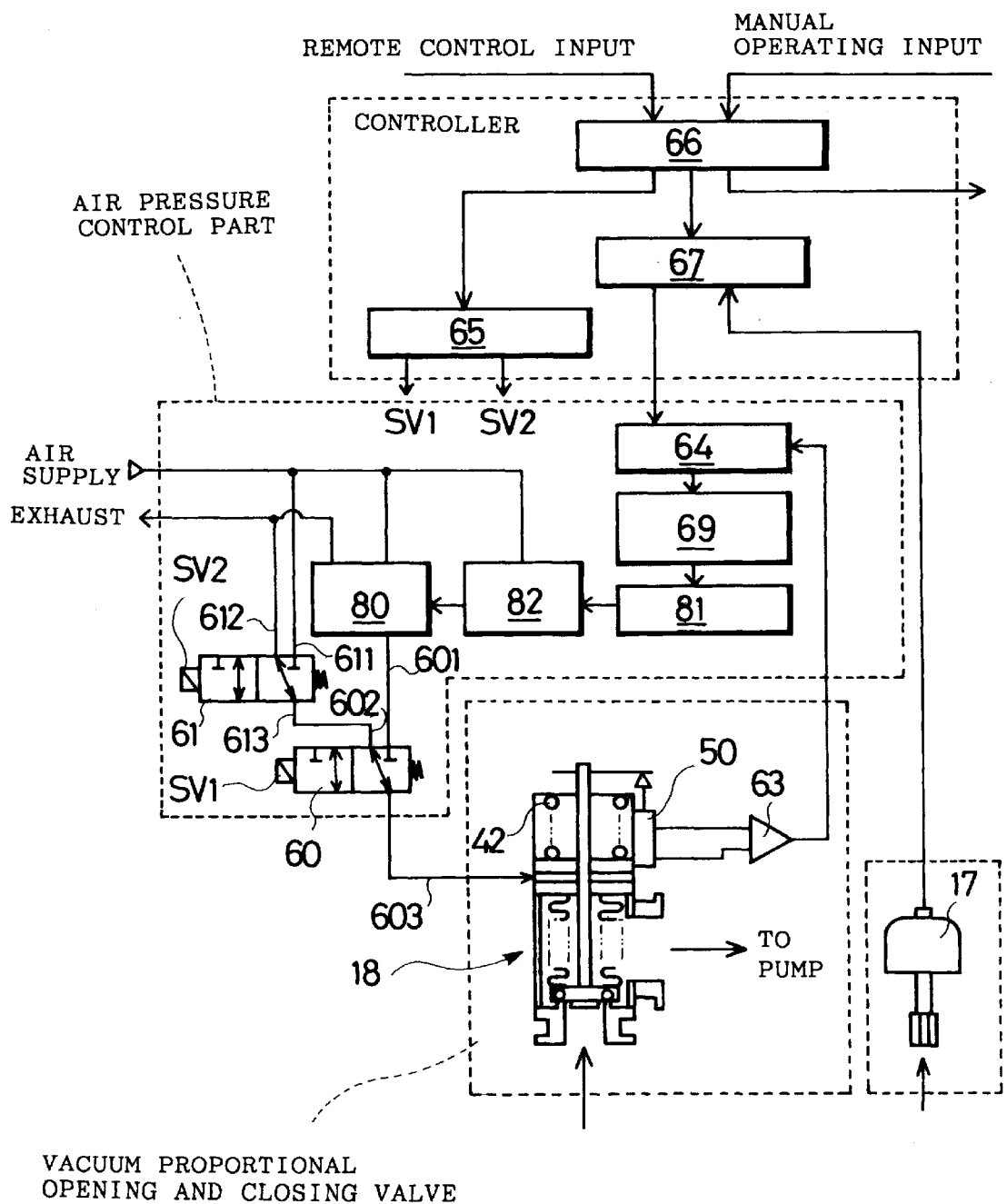
FIG. 8 is a block diagram showing a whole construction of the control device in the vacuum pressure control system in the second embodiment according to the present invention.

A second embodiment of the present invention will now be described below. The basic construction is substantially the same as that of the first embodiment, different parts only will be described hereinafter and similar parts are denoted by the same reference numerals as those of the first embodiment. FIG. 8 is a whole system and FIG. 7 is a detail construction including peripheral equipment of a nozzle flapper type servo valve 80 which is used in the second embodiment instead of the time on-off acting valve 62 in the first embodiment The pulse drive circuit 68 is also replaced with a piezoelectric bimorph driving circuit 69. The construction of the nozzle flapper type servo valve 80 is well known in the art and therefore its detail explanation will be omitted in the present embodiment. In this servo valve 80, particularly, a piezoelectric bimorph 81 is attached so as to cover an opening of a nozzle 82 communicating with a pilot chamber 84 formed above a pair of diaphragms 86 (86*a* and 86*b*).

The piezoelectric bimorph 81 is controlled by the piezoelectric bimorph driving circuit 69 to adjust the amount of covering the nozzle 82. The piezoelectric bimorph 81 may be replaced for moving coils. A constructed diaphragm 85 to hold the diaphragms 86 and the lower end surface thereof is contact with a main valve member 88. The constructed diaphragm 85 is provided with an exhaust valve hole 87. The pilot chamber 84 is communicated via an orifice 83 with a pneumatic port 89. The pneumatic port 89 and a pilot valve port 91 will be communicated and interrupted by the main valve member 88. The space under the diaphragm 86*a* is communicated with an exhaust port 90. The exhaust valve hole 87 allows the pilot valve port 91 and the exhaust port 90 to communicate when the constructed diaphragm 85 and the main valve member 88 are separated as will be described below.

With the construction mentioned above, the nozzle flapper type servo valve 80 can precisely control the output pressure of the pilot valve port 91 to become equal to a predetermined value applied by the piezoelectric bimorph driving circuit 69.

The positional control circuit 64 then makes comparison between a command signal representative of a desired opening value of the vacuum proportional valve 18 and the output of the potentiometer 50 representative of the measured value of the position of the piston 41. When the command value is larger than the measured value, the piezoelectric bimorph 81 is applied with a larger amount of voltage. This causes displacement of an end of the piezoelectric bimorph 81 downward to close the opening of the nozzle 82. At this time, a part of supply air is entered into the pilot chamber 84 though the orifice 83, and the pressure inside of the pilot chamber 84 is increased since the opening of the nozzle 82 is closed by the piezoelectric bimorph 81, therefore pressing the diaphragms 86 downward together with the main valve member 88. The main valve member 88 then opens to communicate the pilot valve port 91 and the pneumatic port 89 to supply air.

As the pressure in the pilot valve port 91 is increased due to the air supply, the pressure between a pair of diaphragms 86 is increased. Then, the difference in the pressed area between the diaphragms 86 causes the constructed diaphragm 85 to get moving back upward, when the measured value fed back from the potentiometer 50 is more increased and the difference between the command value and the measured value is reduced, so that the displacement of the piezoelectric bimorph 81 is reduced to cause the opening of the nozzle 82 to open. The pressure in the pilot chamber 84 is decreased accordingly, and the diaphragms 86 are moved up to close the main valve member 88. In addition, if the output pressure of the pilot valve port 91 get higher with respect to the a desired value, the constructed diaphragm 85 is pressed more upward, which allows the exhaust valve hole 87 to open and then to reduce the output pressure. The above function makes it possible to obtain the output in response to the command signal with good responsibility and precision.

As described above, in the system of the second embodiment the piezoelectric bimorph driving circuit 69 effects control of the nozzle flapper type servo valve 80 to regulate the pressure of air to be supplied to the vacuum proportional opening and closing valve 18, which enables control of the position of the piston 41 with a high responsibility and high accuracy.

Third embodiment of the present invention will be described below. This embodiment having its characteristic in a way of controlling the servo valve.

Figure 9:
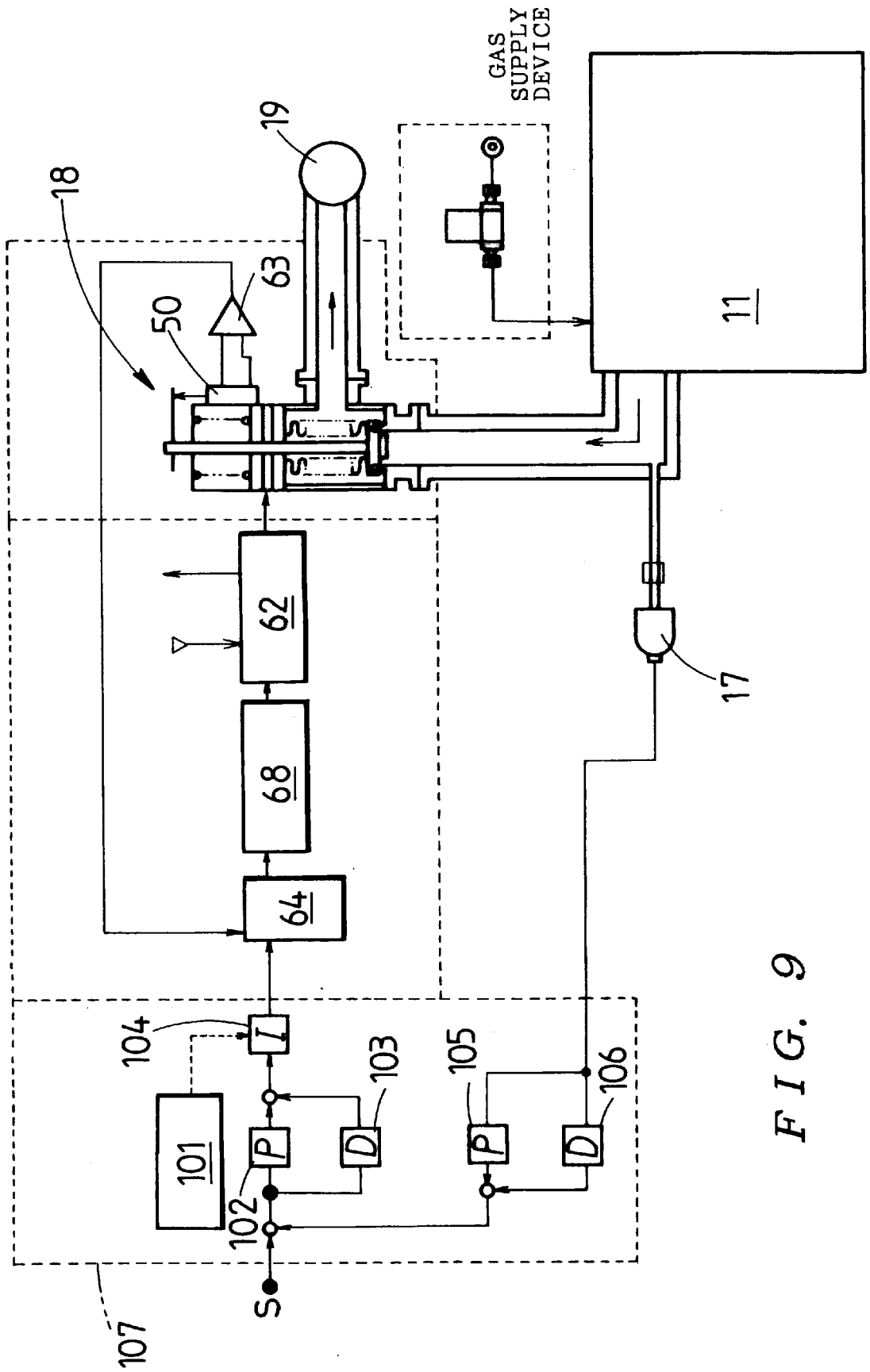
FIG. 9 is a block diagram showing the construction of the servo valve control device.

FIG. 9 is a block diagram of the system of the first embodiment which is applied with the servo valve control way.

In a vacuum pressure control circuit 107, a measured value applied by the pressure sensor 17 measuring the vacuum pressure in the vacuum chamber 11 is regulated in a proportional plus derivative circuits 105 and 106 and then compared with a command value S of a desired vacuum pressure applied by the central control device, and input into a proportional plus derivative circuits 102 and 103. An integrating circuit circuit 104, connected in series with the proportional plus derivative circuits 102 and 103, provides voltages in a range of 0–5 V to provide outputs representative of the difference between both above values to the positional control circuit 64. Time constant of the integrated circuit 104 is determined by an integrated time regulating circuit 101.

If the measured value of the pressure sensor 17 is different from a command value of a desired vacuum pressure, an internal processing circuit acts to extremely shorten the integrating time of the integrating circuit 104. The integrating circuit 104 therefore works as an amplification circuit having substantially infinite gain.

That is, when the measured value of the pressure sensor 17 is larger than the desired vacuum pressure command value, the integrating circuit 104 outputs a voltage of 5 V which is maximum to the positional control circuit 64. Consequently, the vacuum proportional valve 18 is driven to rapidly open its opening of valve.

When the measured value of the pressure sensor 17 is smaller than the desired vacuum pressure command value, to the contrary, the integrating circuit 104 outputs a voltage of 0 V which is minimum to the positional control circuit 64. The vacuum proportional valve 18 is driven to rapidly close its opening of valve.

By the control of motion of vacuum proportional valve 18 as above, the poppet valve 33 can reach for the shortest time close to a position at which the measured value is equalized to the desired value.

After that, when sensing the poppet valve 33 has reached close to that position, the integrating time regulating circuit 101 makes a shift to a preregulated time constant of the integrating circuit 104 in order to retain the poppet valve 33 at that position while maintaining the vacuum pressure stable.

The reason thereof will now be explained.

Figure 13:
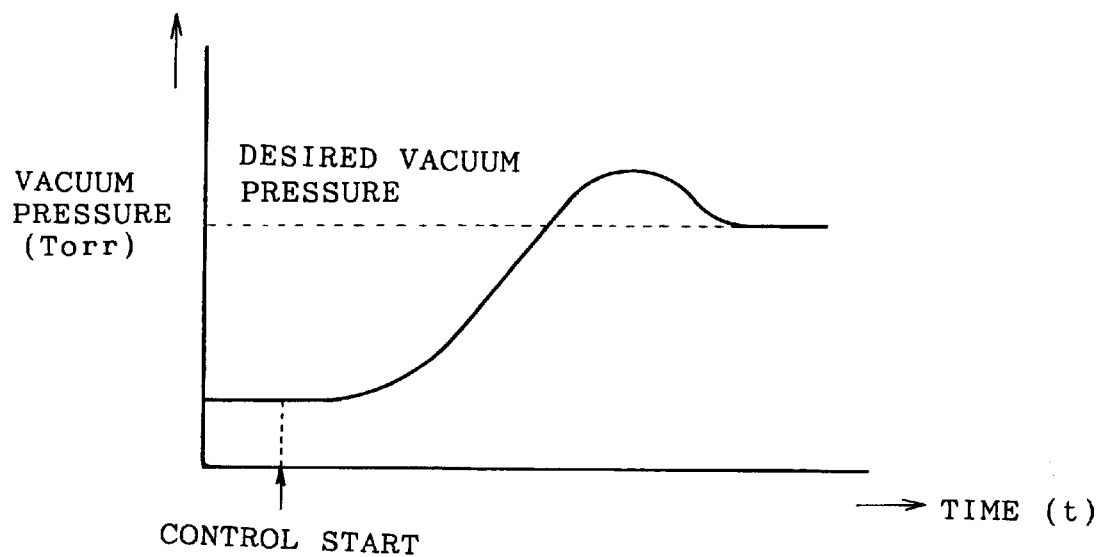
FIG. 13 is a chart of results obtained by using the conventional control method.
Figure 14:
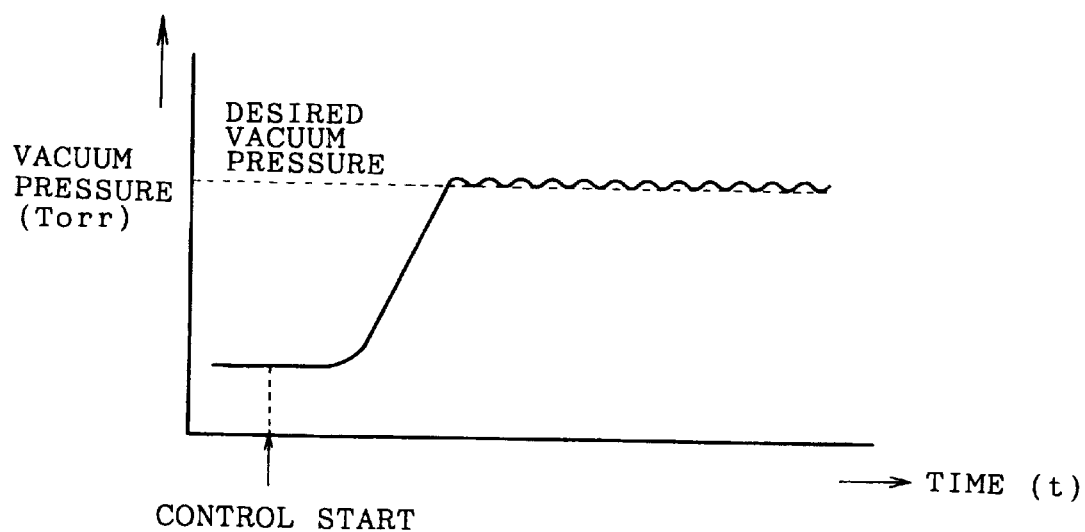
FIG. 14 is a chart of results obtained by using another conventional control method.

If the vacuum pressure, to maintain the vacuum pressure more stable than when the measured value of the pressure sensor 17 is different from the desired vacuum pressure command value, is controlled with the preregulated time constant of the integrating circuit 104, there is a problem of large overshoot appearing due to the delay of phase after the vacuum pressure comes slowly near and becomes equal to the desired value, as seen in FIG. 13.

If control of the vacuum pressure is constantly effected with the same time constant of the integrating circuit as that of when the measure value and the desired value are different, the measured vacuum pressure can reach the desired pressure for the shortest time, but causes offset vibration about the desired pressure value.

To avoid this problem, when the measured value of the pressure sensor 17 is larger than the desired, the voltage representative of the maximum operating amount to the positional control circuit 64. When it is sensed that the actual lift amount has come substantially to a lift amount at which it is desired to keep the vacuum pressure, gradually shifting action to the preregulated time constant of the integrating circuit is conducted to maintain the vacuum pressure stable with the poppet valve 33 kept at that position. Control of the vacuum proportional valve 18 can be effected stably for the shortest time and without generating vibration.

The vacuum pressure control circuit 107 including integration time regulating circuit 101 and the integrating circuit 104 and others is designed by means of a microcomputer, so renewal of the integrating time is made on a program. Specifically, the microcomputer constantly samples the measured voltage value of the pressure sensor 17 measuring the vacuum pressure and the desired command value and carries out the internal process to determine variable of the integrating time. The internal process finds a difference between the measured voltage value of the pressure sensor 17 and the desired value and makes the integrating time longer as the difference decreases and shorter as it increases. This operation may also be carried out using proportional function or quadratic function.

The present invention may be embodied in other specific forms without departing from the spirit or essential characteristics thereof. For instance, the potentiometer 50 may be replaced with magnetic linear scales and optic type linear scales or rotary encoder if considering space-saving.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vacuum pressure control system comprising a vacuum vessel, a vacuum pump for sucking gas in said vacuum vessel, a vacuum proportional opening and closing valve disposed on a pipe connecting the vacuum vessel and the vacuum pump, the vacuum proportional opening and closing valve changing its opening to change the vacuum pressure in the vacuum vessel, a pressure sensor to measure the vacuum pressure in the vacuum vessel and a vacuum pressure control device to control the opening of the vacuum proportional opening and closing valve based on the output of the pressure sensor, wherein said vacuum proportional opening and closing valve includes a valve seat having a central flow passage and a valve member having a peripheral portion that is inserted in the central flow passage and having an upper part, a substantially vertical surface formed on the upper part of the peripheral portion and a tapered surface formed on the peripheral portion below the vertical surface, and a substantially horizontal surface portion extending outwardly from the vertical surface and having a seal disposed thereon, and a pilot valve connected to move the valve member in the central flow passage, the substantially vertical surface fitting the central flow passage so that when the substantially vertical surface is in the central flow passage, gas leaks past the valve member until the seal engages the valve seat; and said vacuum pressure control device controlling a servo valve to change the air pressure to be supplied to said pilot valve based on the output of said pressure sensor.

2. A vacuum pressure control system according to claim 1, wherein said pilot valve included in said vacuum proportional opening and closing valve including;

a hollow cylindrical chamber;

a piston slidably mounted in said cylindrical chamber, and a bellofram having an inner periphery and an outer periphery and joined at its inner periphery with said piston and its outer periphery with a wall of said cylindrical chamber.

3. A vacuum pressure control system according to claim 1, wherein said servo valve to change the pressure of air to be supplied to said pilot valve includes a solenoid valve which provides timed on-off actuation in response to pulse frequency, the solenoid valve comprising an air supply solenoid valve connected between said pilot valve and an air source and an air exhaust solenoid valve connected between said pilot valve and an exhaust pipe, and said vacuum pressure control device provides pulse signals to said air supply solenoid valve and said air exhaust solenoid valve to control the opening of said vacuum proportional opening and closing valve.

4. A vacuum pressure control system according to claim 1, wherein said servo valve to change the pressure of air to be supplied to said pilot valve comprises a servo valve of nozzle flapper type, and said vacuum pressure control device controls an opening of a nozzle of said nozzle flapper type servo valve by using a piezoelectric bimorph thereby to control the opening of said vacuum proportional opening and closing valve.

5. A vacuum pressure control system according to claim 1, wherein said vacuum pressure control device makes calculation of a difference between a desired value of vacuum pressure and the output of said pressure sensor and then, if the difference is larger than a predetermined value, applies voltage representative of the maximum operating amount to said servo valve.

6. A vacuum pressure control system according to claim 1, wherein said pilot valve includes a cylinder of normally closed type, which closes said vacuum proportional opening and closing valve in interruption of electric service.

7. A vacuum pressure control system according to claim 2, wherein said servo valve to change the pressure of air to be supplied to said pilot valve includes a solenoid valve which provides timed on-off actuation in response to pulse frequency, the solenoid valve comprising an air supply solenoid valve connected between said pilot valve and an air source and an air exhaust solenoid valve connected between said pilot valve and an exhaust pipe, and said vacuum pressure control device provides pulse signals to said air supply solenoid valve and said air exhaust solenoid valve to control the opening of said vacuum proportional opening and closing valve.

8. A vacuum pressure control system according to claim 2, wherein said servo valve to change the pressure of air to be supplied to said pilot valve comprises a servo valve of nozzle flapper type, and said vacuum pressure control device controls an opening of a nozzle of said nozzle flapper type servo valve by using a piezoelectric bimorph thereby to control the opening of said vacuum proportional opening and closing valve.

9. A vacuum pressure control system according to claim 2, wherein said vacuum pressure control device makes calculation of a difference between a desired value of vacuum pressure and the output of said pressure sensor and then, if the difference is larger than a predetermined value, applies voltage representative of the maximum operating amount to said servo valve.

10. A vacuum pressure control system according to claim 2, wherein said pilot valve includes a cylinder of normally closed type, which closes said vacuum proportional opening and closing valve in interruption of electric service.

11. A vacuum pressure control system according to claim 3, wherein said vacuum pressure control device makes calculation of a difference between a desired value of vacuum pressure and the output of said pressure sensor and then, if the difference is larger than a predetermined value, applies voltage representative of the maximum operating amount to said servo valve.

12. A vacuum pressure control system according to claim 3, wherein said pilot valve includes a cylinder of normally closed type, which closes said vacuum proportional opening and closing valve in interruption of electric service.

13. A vacuum pressure control system according to claim 4, wherein said vacuum pressure control device makes calculation of a difference between a desired value of vacuum pressure and the output of said pressure sensor and then, if the difference is larger than a predetermined value, applies voltage representative of the maximum operating amount to said servo valve.

14. A vacuum pressure control system according to claim 4, wherein said pilot valve includes a cylinder of normally closed type, which closes said vacuum proportional opening and closing valve in interruption of electric service.

15. A vacuum pressure control system comprising a vacuum vessel, a vacuum pump for sucking gas in said vacuum vessel, a vacuum proportional opening and closing valve disposed on a pipe connecting the vacuum vessel and the vacuum pump, the vacuum proportional opening and closing valve changing its opening to change the vacuum pressure in the vacuum vessel, a pressure sensor to measure the vacuum pressure in the vacuum vessel and a vacuum pressure control device to control the opening of the vacuum proportional opening and closing valve based on the output of the pressure sensor, wherein said vacuum proportional opening and closing valve includes a valve seat, and a valve member having a tapered surface on its outer periphery and a straight surface on its outer periphery next following the tapered surface, the tapered surface being movable along a center line of said valve seat, the straight surface fitting the valve seat to provide a leakage passage of gas when substantially in contact with the valve seat so as to provide a low vacuum region and permitting passage of gas when out of contact with the valve seat to permit a change in vacuum pressure in a medium vacuum region in which the change in vacuum pressure is responsive to a clearance area between said valve seat and said tapered surface; and a pilot valve connected to the valve member, said vacuum pressure control device controlling a servo valve to change the air pressure to be supplied to said pilot valve based on the output of said pressure sensor.

* * * * *